(No Model.)
J. GIBBINS.
ELEVATOR ENGINE.
No. 454,012. Patented June 9, 1891.
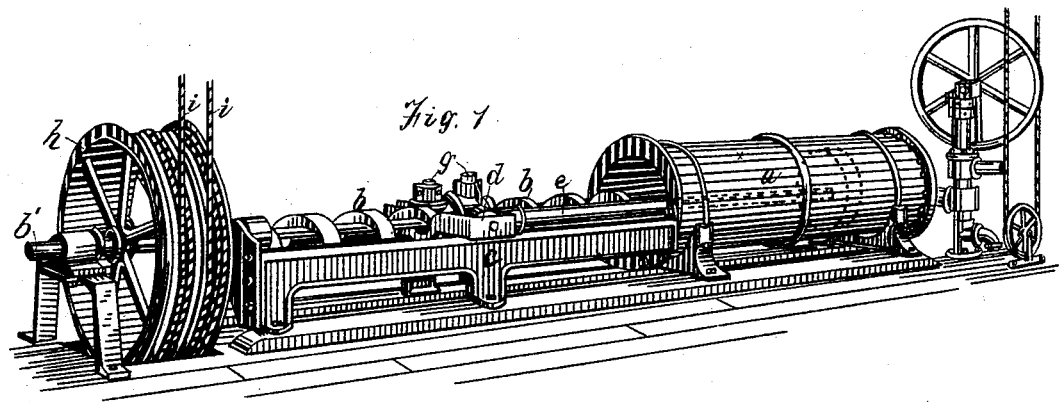
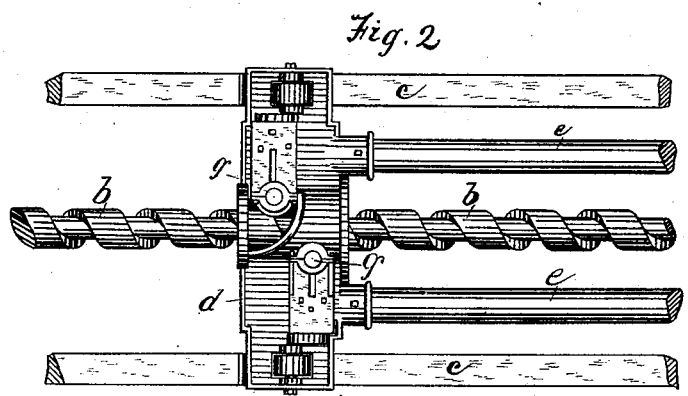
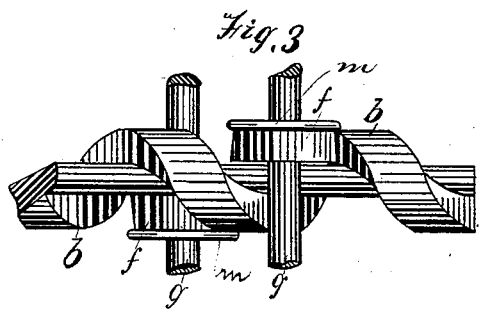
Witnesses
Carl J. Dietrich
Frank W. Lee
Inventor
James Gibbins
By his Attorney
Allen Webster

UNITED STATES PATENT OFFICE.

JAMES GIBBINS, OF SPRINGFIELD, MASSACHUSETTS, ASSIGNOR TO THE SPRINGFIELD FOUNDRY COMPANY, OF SAME PLACE.

ELEVATOR-ENGINE.

SPECIFICATION forming part of Letters Patent No. 454,012, dated June 9, 1891.

Application filed February 18, 1889. Serial No. 300,245. (No model.)

*To all whom it may concern:*

Be it known that I, JAMES GIBBINS, a citizen of the United States, residing in Springfield, Hampden county, Massachusetts, have invented new and useful Improvements in Elevator-Engines, of which the following is a specification, reference being had to the accompanying drawings and letters of reference marked thereon.

This invention relates more particularly to improvements on the class of elevator-engines shown in the United States Letters Patent issued to me on the second day of March, A. D. 1886, No. 337,056, an elevator-engine wherein a worm or screw is employed to convert reciprocating into rotary motion.

In the device therein shown, the screw passes through a plain nut, and I find that in such device there is a considerable loss of power resulting from friction; and the object of my present invention is to provide means whereby this friction will be greatly reduced or abolished.

My invention consists in providing pulleys, rolls, or wheels to bear against or within the screw or worm and overcome the friction. It further consists in the combination and arrangement of parts, as hereinafter described, and pointed out in the claims.

In the accompanying drawings, in which like letters of reference indicate like parts, Figure 1 is a perspective view of my improved device. Fig 2 is a plan view of a part of the apparatus, and Fig. 3 is a view of the worm or screw and anti-friction pulleys.

In detail, $a$ indicates a cylinder; $b$, a worm or screw; $c$, ways; $d$, a cross-head; $e$, piston-rods; $f$, pulleys; $g$, studs, upon which the pulleys are mounted; $h$, a cable-drum, and $i$ cables.

The preferred form of construction is as follows: A cylinder is provided having one end closed and the opposite end open, and is provided with a suitable piston-head and two or more piston-rods $e$, rigidly secured thereto. A cross-head $d$ is secured to the piston-rods and is arranged to move on the ways $c$. A screw or worm $b$ is suitably supported in the frame so that it may revolve, but motion in the direction of its length be prevented. The screw-shaft may be extended, forming a shaft $b'$, upon which a cable drum or pulley is mounted, or the rotation of the screw may be imparted to the cable-winding mechanism in any other desired manner.

In the place of the usual threaded nut arranged in the cross-head to engage the threads on the screw or worm $b$, I arrange two pulleys or wheels $f$, one being arranged at each side, as shown, so that as the cross-head moves the peripheries of these pulleys are in contact with the thread, and being free to revolve will overcome or avoid the friction which results from the use of an ordinary nut. These rollers are formed with rim-flanges $m$, as shown in the drawings, to bear on the face of the screw and keep it from springing.

The screw or worm may be fixed at one end to move out and in with the piston-head, and the cross-head be permanently fixed in one position, the shaft $b'$ in this event being very much longer and adapted to move through the hub of the drum or pulley, and prevented from turning therein by the usual arrangement of a spline, the relative arrangement of the anti-friction pulleys in this case being the same as first described.

Having therefore described my invention, what I claim, and desire to secure by Letters Patent, is—

1. In an elevator-engine, the combination of a cylinder, a piston in the cylinder, having two parallel piston-rods, a cross-head secured to the ends of the piston-rods and held against rotation, a square-threaded screw passing loosely through the cross-head, a cable-winding mechanism connected to the screw, vertical shafts journaled in the cross-head on opposite sides of the screw, and anti-friction rollers on the shafts to engage with their faces the edges of the thread of the screw and arranged above and below the axis of the screw, substantially as described.

2. In an elevator-engine, the combination of a cylinder, a piston in the cylinder, having two parallel piston-rods, a cross-head secured to the ends of the piston-rods and secured against rotation, a square-threaded screw passed loosely through the cross-head, shafts journaled in the cross-head on opposite sides
5 of the screw, and anti-friction rollers on the shafts, formed with rim-flanges to engage with their faces the threads of the screw, and with their rim-flanges the face thereof, substantially as described.

JAMES GIBBINS.

Witnesses:
ALLEN WEBSTER,
J. W. HUNT,